(12) United States Patent
Smith et al.

(10) Patent No.: US 9,166,228 B2
(45) Date of Patent: Oct. 20, 2015

(54) METHOD OF EXPLOITING PARTICLE MORPHOLOGY TO OPTIMIZE GRANULAR STRUCTURE AND CHARGE/DISCHARGE PERFORMANCE OF LITHIUM ION BATTERY CATHODES

(75) Inventors: Kyle C. Smith, West Lafayette, IN (US); Timothy S. Fisher, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 985 days.

(21) Appl. No.: 13/290,546

(22) Filed: Nov. 7, 2011

(65) Prior Publication Data

US 2012/0112132 A1    May 10, 2012

Related U.S. Application Data

(60) Provisional application No. 61/410,475, filed on Nov. 5, 2010.

(51) Int. Cl.
| | | |
|---|---|---|
| *H01M 4/04* | (2006.01) | |
| *H01M 4/58* | (2010.01) | |
| *H01B 1/14* | (2006.01) | |
| *H01M 4/136* | (2010.01) | |
| *H01M 4/1397* | (2010.01) | |
| *B82Y 30/00* | (2011.01) | |
| *C01B 25/39* | (2006.01) | |
| *C01B 25/37* | (2006.01) | |
| *C01B 25/30* | (2006.01) | |

(52) U.S. Cl.
CPC ............ *H01M 4/5825* (2013.01); *H01M 4/136* (2013.01); *H01M 4/1397* (2013.01); *B82Y 30/00* (2013.01); *C01B 25/30* (2013.01); *C01B 25/375* (2013.01); *C01B 25/39* (2013.01); *C01P 2004/24* (2013.01); *C01P 2004/34* (2013.01); *Y02E 60/122* (2013.01)

(58) Field of Classification Search
None
See application file for complete search history.

(56) References Cited

U.S. PATENT DOCUMENTS

| | | | | |
|---|---|---|---|---|
| 2009/0286159 | A1* | 11/2009 | Nuspl et al. | 429/221 |
| 2010/0120179 | A1* | 5/2010 | Zhamu et al. | 438/19 |
| 2010/0143798 | A1* | 6/2010 | Zhamu et al. | 429/212 |

* cited by examiner

*Primary Examiner* — Tanisha Diggs
(74) *Attorney, Agent, or Firm* — Purdue Research Foundation

(57) ABSTRACT

A method is provided for forming a high-capacity, high-rate lithium ion battery cathode material. The method includes providing a synthesized material of electrochemically active plate-shaped nanoparticles and adding a plurality of appropriately sized diluent particles to the plate-shaped nanoparticles to form a suspension. Any liquid is removed from the solution to form a composite material. The method also includes processing the composite material to form a high-capacity, high-rate lithium ion battery cathode material.

8 Claims, 4 Drawing Sheets

METHOD OF EXPLOITING PARTICLE MORPHOLOGY TO OPTIMIZE GRANULAR STRUCTURE AND CHARGE/DISCHARGE PERFORMANCE OF LITHIUM ION BATTERY CATHODES

RELATED APPLICATIONS

This application claims priority to U.S. Provisional Patent Application Ser. No. 61/410,475, filed Nov. 5, 2010, which is hereby incorporated by reference in its entirety.

BACKGROUND

The present invention generally relates to a lithium ion battery cathode, and in particular to a method of optimizing granular structure and performance of a lithium ion battery cathode.

The development of lithium-ion batteries with high energy density and discharge/recharge rates is important to their utilization in transportation, energy storage, and portable electronics applications. In addition, development of lithium ion batteries with dense, three-dimensional architectures can enable micro-powered, micro-electromechanical systems and independently powered 'smart dust' particles to enable highly distributed computing.

Lithium cobalt oxide batteries, and in particular $LiCoO_2$-graphite based batteries, have enjoyed commercial success since being introduced to the market. However, the limited availability of cobalt has hindered its economic viability for high-power applications such as hybrid-electric vehicles and portable electronic applications, each of which can require a large amount of charge storage. Due to its limited availability, cobalt can be expensive and thus less commercially viable for these industries. As a result, lithium iron phosphate, $LiFePO_4$, has been analyzed more extensively as a potential replacement for the development of low-cost, environmentally inert lithium iron batteries. As described below, $LiFePO_4$, has different material properties that can affect lithium ion diffusion. In particular, lithium ions can diffuse one-dimensionally and preferentially along one direction in the crystal. This direction is typically the direction in the crystal due to crystal structure and chemical interaction therein.

During a discharging process (e.g., where power is being delivered from the battery), an anode of the battery serves as a source of lithium ions to be inserted into a solid cathode by transporting across an ionically-conducting electrolyte, while electrons flow from the anode to cathode through an external circuit. Anodes are typically composed of a graphite material that is intrinsically, electrically conductive. Cathodes are commonly fabricated with lithium-containing compounds, often referred to as insertion materials. In contrast, lithium oxide compounds have recently become popular cathode materials. Cathode composition limits the amount of ionic charge that can be reversibly stored in the battery.

The one-dimensional nature of ion diffusion in $LiFePO_4$ has been the subject of recent experimental and theoretical studies. In addition, during synthesis of $LiFePO_4$ particles, the particles have shown a tendency to form facets perpendicular to the highly ion conducting direction, namely the [010] direction. Accordingly, attempts have been made to maximize surface area of particles along that direction through the adjustment of synthesis conditions. Despite possessing 10% higher gravimetric energy density than $LiCoO_2$, $LiFePO_4$ can possess 20% lower volumetric energy density than $LiCoO_2$. Therefore, to exceed the effective volumetric energy density of current batteries, it is desirable to fabricate densely packed microstructures which are generally synthesized through a wet chemical process to achieve sufficiently high volumetric density of energy storage. Such requirements, however, may limit the economic viability of cathode architectures exhibiting low packing density. Although the highly porous structure may result in high gravimetric density and high rate performance, visual investigation of SEM images reveals that the solid density is actually less than 30%. The inhibition of electrolyte penetration and subsequent reduction of electrochemical performance has been found due to the agglomeration of particles.

Experimentally, it has been found that if the size of the $LiFePO_4$ particles is reduced, the diffusion length scales through which ions diffuse is also reduced. Thus, higher diffusion rates are possible which enables $LiFePO_4$ particles to be used for battery applications. In addition, different shapes of $LiFePO_4$ particles can be synthesized including nanoplatelets and equiaxed particles. The smallest sized shape that has been synthesized is the [010] platelet. Low aspect ratio plate-shaped particles, however, have shown a tendency to exhibit columnar ordering. As a result of the tendency of $LiFePO_4$ to form facets normal to [010], the fast lithium ion diffusion direction, such ordering can prevent or inhibit access of liquid electrolyte to the highly active surfaces. In other words, columnar ordering can reduce ion transport due to an increase in the diffusion length scales for ions in the material, and thereby a reduction in diffusion rate. A reduction in diffusion rate can negatively impact charge storage and thereby the commercial viability of $LiFePO_4$ particles for use in the cathode material.

A need therefore exists for a method to reduce or eliminate the effects of columnar ordering and provide a means for effective ion diffusion for commercially-viable applications.

SUMMARY

In one exemplary embodiment, a method is provided for forming a high-capacity, high-rate lithium ion battery cathode material. The method includes providing a synthesized material of electrochemically active plate-shaped nanoparticles and adding a plurality of appropriately sized diluent particles to the plate-shaped nanoparticles to form a mixed suspension or dry granular mixture. Any liquid is removed from the solution to form a composite material. The method also includes processing the composite material to form a high-capacity, high-rate lithium ion battery cathode material.

In one form of this embodiment, the electrochemically active material comprises lithium iron phosphate. In another form thereof, the diluent particles comprise any conductive nanoparticle material. Each of the diluent particles comprises a diameter, "d", equal to or less than the thickness, "$t_{[010]}$", of the plate-shaped nanoparticles. The method can also include frustrating the columnar or agglomerated arrangement of plate-shaped particles via steric hindrance induced by diluent particles in the mixture.

The plate-shaped nanoparticles can be separated from one another. In addition, the method can include adding a surfactant to separate the plate-shaped nanoparticles and forming a suspension of the plate-shaped nanoparticles. The processing step can include adding a binding material and a conductive additive to the composite material. Alternatively, the processing step can include curing the composite material and densifying the composite material to form the cathode material. The densifying step comprises passing the composite material through a roll press. Moreover, the removing step of the exemplary method comprises evaporation, freeze drying, or applying a vacuum.

In another embodiment, a method is provided for fabricating lithium ion cathode material for use in a battery application. The method includes providing synthesized lithium iron phosphate plate-shaped nanoparticles and separating the synthesized nanoparticles from one another. The synthesized nanoparticles are suspended. The method also includes frustrating the arrangement of the synthesized nanoparticles to form a solution and removing liquid from the solution to form a composite material. The composite material is processed into lithium ion cathode material.

In this embodiment, the frustrating step comprises adding a plurality of diluent nanoparticles. In addition, the adding step comprises adding a plurality of carbon nanoparticles. The method can further include sizing the diluent nanoparticles such that the diameter of each nanoparticle is approximately equal or less than the thickness of the plate-shaped nanoparticles.

A surfactant can be added before the separating step, whereas a binding material and a conductive additive can be added to the composite material. The processing step can include curing the composite material and densifying the composite material to form the cathode material. The densifying step can comprise passing the composite material through a roll press. Also, the removing step can comprise evaporation, freeze drying, or applying a vacuum.

An advantage of the present disclosure is the ability to frustrate columnar ordering when [010] plate-shaped nanoparticles are used to form a lithium ion cathode. As a result, diffusion length scales are not increased and the diffusion rate is not reduced. When used in a battery, the amount of charge storage can be substantially large to enable the battery to be used in vehicle and electronic portable device applications.

Other advantages of the present disclosure will be described in further detail below, with reference to the figures.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

Figure 1:
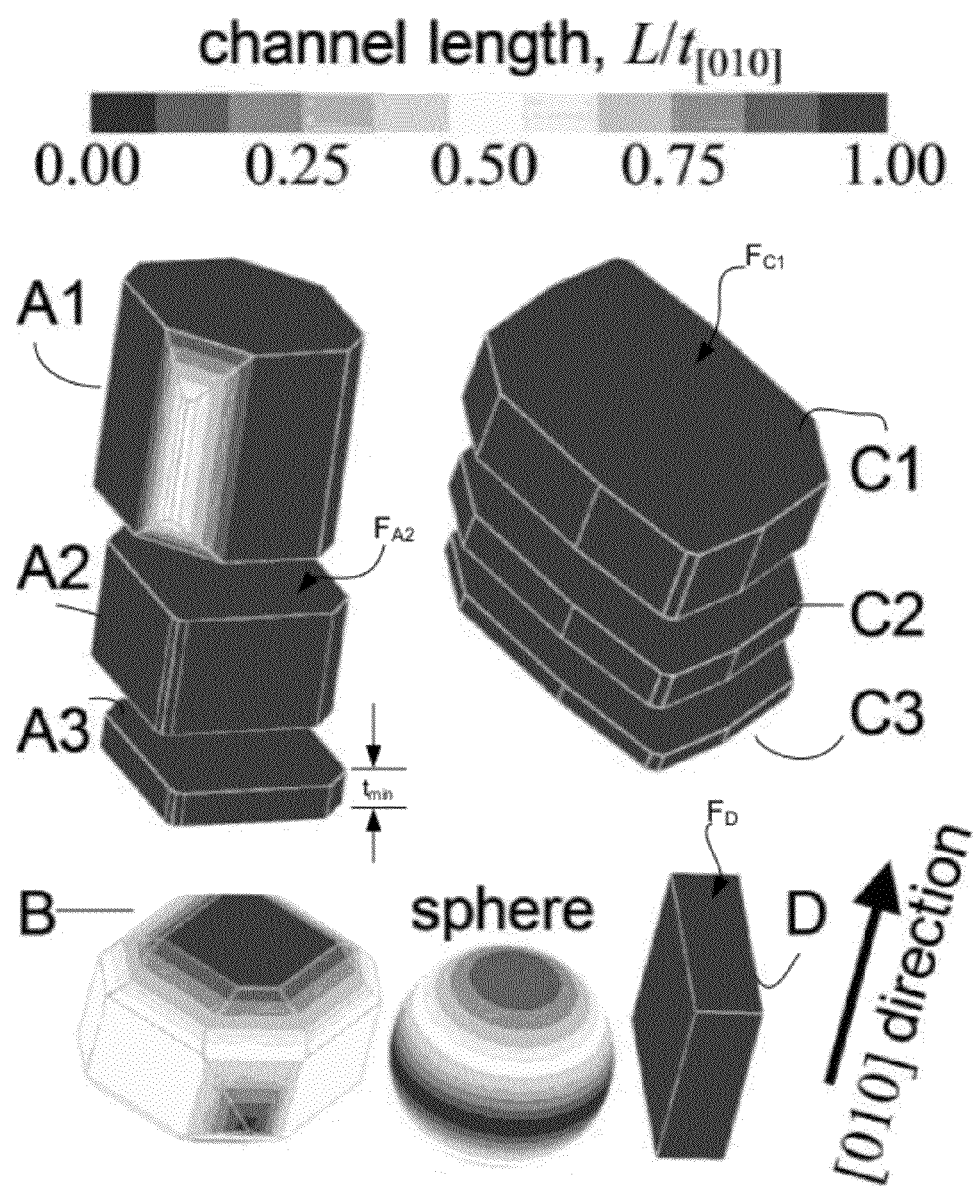
FIG. 1 is a schematic of one embodiment of particle shapes and their local diffusion length scales.

As will be described in further detail below, the present disclosure provides a means for overcoming reduced ion transport in dense cathodes of $LiFePO_4$ and rate performance caused by granular-scale columnar order that is induced by jamming. Self-assembled columns aligned with the [010] direction can result in a reduction of ion transfer in $LiFePO_4$, while columns lacking alignment along [010] can exhibit an enhancement in ion transfer. The embodiments of the present disclosure, along with experimental, simulation and theoretical results as described herein, provide for two alternate development routes for high performance $LiFePO_4$ cathodes: (1) mitigation of columnar order along [010] through introducing columnar frustrating diluent; or (2) reduction of the size of isometric nanoparticles and non-(010) nanoplatelets in pure systems. Incorporation of other multi-scale material development strategies with these approaches may enable the development of inexpensive, high performance lithium ion battery cathodes through material and process design.

Olivine lithium metal phosphates, such as $LiFePO_4$, are an emerging class of cathode materials for the development of low-cost, environmentally benign lithium ion batteries (LIBs). Recent broad-based scientific research plans have recognized that the rapid translation of energy storage materials to the commercial market requires the utilization of physics-based multi-scale modeling to support experimental efforts. The anistropic olivine structure and chemical interactions result in unique properties that emerge in nanoscopic forms of $LiFePO_4$. Insertion of lithium in bulk $FePO_4$ occurs via a two-phase process wherein lithium ions diffuse from a lithium-deficient phase into a lithium-rich phase, which can change to a single-phase process in nanoscale systems. Also, ion diffusion is one-dimensional in anisotropic. In addition, reduction of particle size has generally improved electrochemical nanoscale LiFePO4 performance.

The theories of morphological effects on ion transport in composite $LiFePO_4$ cathodes lack experimental results to achieving such microstructures. For example, mesoscopic effects of particle clustering, graded porosity, particle size, interpenetrating electrodes, continuous phase distribution, fractal phase distribution, and distribution of particle size and conductive diluent have been considered. These theories, however, have failed to incorporate or suggest the variety of particle shapes and diffusion anisotropy exhibited by $LiFePO_4$. Experimental attempts have been made to maximize the (010) surface area of particles normal to the highly diffusing [010] direction in $LiFePO_4$. Additionally, recent experimental observations of shape through transmission electron microscopy and through X-Ray diffraction broadening analysis enable more precise representations of realistic particle shapes. Ab initio models of $LiFePO_4$ crystal growth have predicted particle shapes at both thermodynamic equilibrium and non-equilibrium conditions.

Recent studies have also revealed that jammed systems of superellipsoids, superballs, and cubes can exhibit liquid crystalline phases with particles having negligible kinetic energy. Self-assembly of mesoscopic particles (e.g., colloids and nanoparticles) has been pursued as a route to fabricate novel materials. In particular, rules governing self-assembly have been suggested to tune interactions among anisotropic particles to avoid amorphous or glassy structures. Self-assembly and amorphous particulate structures predicted by various simulation methods (e.g., gravitational sedimentation, mechanical contraction method, thermodynamic Monte Carlo, and athermal jamming) can vary unless such structures are in the same mechanical state undergoing similar local interactions. The jamming point can be a generic unifying state at which to compare structures, as it can provide consistent structure between hard and soft particle systems. Such packing effects are critical for $LiFePO_4$-based cathodes. Despite possessing 10% higher gravimetric charge capacity than LiCoO$_2$, which is the current industry standard cathode material, LiFePO$_4$ possesses 20% lower volumetric charge capacity.

In the present disclosure, simulations and analysis have been performed of the structure of high-density, many-particle assemblies of experimentally and theoretically inspired LiFePO$_4$ nano-crystal shapes via granular jamming and the galvanostatic discharge performance of the resulting heterogeneous media. These structural effects cause difficulties with ion transport in anisotropic LiFePO$_4$.

Referring to FIG. 1, a variety of theoretically (A1, A2, A3, B) and experimentally (C1, C2, C3, D, sphere) defined particle shapes relevant to LiFePO$_4$ were studied. Shapes A1 and B in FIG. 1 are equilibrium crystal shapes determined by Wulff construction. To simulate the effect of changing the chemical state of the (010) surface, surface energy was varied from the value used to obtain A1 to obtain shapes A2 and A3. Shapes C1, C2, and C3 represent homologous variations of the shape based on transmission electron microscopy images. Shape D was defined via spherical harmonic analysis of X-ray diffraction broadening. Spherical nanoparticles have been synthesized experimentally as well.

Structural effects occur when many of these shapes are densely jammed together from an initially dilute, random state. Of particular interest is the phenomenon of columnar ordering in which particles tend to form stacks with multiple face-to-face contacts between orientationally-ordered particles. To link shape to the structure of jammed systems quantitatively, the aspect ratio of each shape is defined as $$a'=(A_{max})^{1/2}/t_{min},$$

where $A_{max}$ and $t_{min}$ are the maximal projected surface area among all possible directions and the thickness of the shape normal to the projection direction of $A_{max}$, respectively. In FIG. 1, shapes A1, B, and the sphere are isometric shapes referred to as nanoparticles having aspect ratios of 0.80, 0.97, and 0.79, respectively. Shapes A2, A3, C1, C2, and C3 are nanoplatelets with the largest face normal to the [010] direction and exhibiting aspect ratios of 1.5, 5.2, 5.2, 10, and 21, respectively. Shape D exhibits an aspect ratio of 2.9 and is also a nanoplatelet but with the [010] direction in the plane of the largest face.

The morphological similarities among these shapes suggest that similar jammed structures will be formed, but the crystallographic orientation of nanoplatelets may either have a benign or catastrophic effect on ion transport. For example, nanoparticles (defined by shapes A1 and B) can jam or arrange into disordered structures with 93% and 98%, respectively, of their surface area normal to [010] exposed to electrolyte. The lack of columnar ordering in these systems is evidenced by column heights limited to $2t_{[010]}$. Columnar ordering in the system of shape D is beneficial to lithium ion transport because [010] faces, $F_D$, are arranged on the periphery of self-assembled columns exposed to electrolyte. Consequently, 98% of surface area normal to the [010] direction is preserved upon jamming of the system of shape D, suggesting that ion transport performance will be relatively uninhibited by dense packing.

Figure 2:
FIG. 2 is a schematic of a different embodiment of shaped nanoparticles, microstructure formation, and electron and ion transport rate with respect to the addition of conductive diluent.

The remaining nanoplatelets (A2, A3, C1, C2, C3) display largest faces normal to [010], and columnar ordering therein obscures the [010] faces from electrolyte. In FIG. 2, the largest faces in shapes A2 and C1 are shown as $F_{A2}$ and $F_{C1}$, respectively. Most notably, the largest aspect ratio nanoplatelet system, i.e., shape C3, has only 31% of its [010] surface area exposed to electrolyte. The mean column height of this system is quite large ($h \approx 6t_{[010]}$), thereby implying that one-dimensional channels are substantially longer on average than those of isolated nanoplatelets. These structures can form in jammed systems that lack thermal agitation.

Columnar order can cause obscuration of active surfaces (e.g., for systems of shapes A2, A3, C1, C2, and C3) and requires mitigation for optimal battery performance (i.e., rate and charge capacity). As it turns out, agglomeration, or columnar ordering, is not a simple process that occurs via surface attractive forces. In the absence of these forces, and due to the geometric shape of the particles, when pressed together into a dense cathode the particles tend to order into a columnar structure which resembles the agglomerated structure. Thus, development of other particle shapes besides [010] nanoplatelets with smaller sizes can be beneficial and yield improved performance over the [010] platelets.

Referring to FIG. 2, an exemplary granular mixing mitigation strategy is provided whereby LiFePO$_4$ nanoplatelets of certain aspect ratio a' and size $t_{[010]}$, where "t" refers to thickness of the platelet, can be mixed randomly with appropriately sized, nominally spherical diluent nanoparticles of diameter "d". As will be described in further detail, the mixture of LiFePO$_4$ nanoplatelets and appropriately sized diluent nanoparticles can frustrate columnar ordering and achieve improved rate capability of the LiFePO$_4$ particles as if these particles were isolated in space and not interacting with any other particle.

The size of the diluent nanoparticles, however, can have a significant effect on the frustration of columnar ordering. In one instance, frustration can occur when the diluent nanoparticles are substantially smaller in size than the LiFePO$_4$ nanoplatelets. In a related aspect, it can be desirable for the diameter of the diluent nanoparticles to be 20 nm or less. In another aspect, the diluent nanoparticles can have a diameter similar to the thickness of the nanoplatelet, i.e., equal to or less than. To frustrate columnar ordering, both the size and amount (e.g., wt % or volume %) of the diluent nanoparticles can be desirably controlled. As uncovered through a physics-based simulation, smaller diluent nanoparticles tend to achieve greater frustration efficiency. Specifically, for a volume fraction of 34% carbonaceous diluent nanoparticles mixed with electrochemically active plate-shaped nanoparticles (e.g., LiFePO$_4$), diluent nanoparticles with a diameter $1.5t_{[010]}$ exhibited better frustration of columnar ordering than those with $3t_{[010]}$.

As described, a primary function of diluent nanoparticles is to introduce steric defects between pure nanoplatelets to frustrate columnar ordering. The effectiveness of this approach can be further shown from experimental studies on mixtures of 66 vol % LiFePO$_4$ mixed with diluent nanoparticles having a size of $d=1.5t_{[010]}$ in which column heights are reduced by the presence of diluent (e.g., see the comparison of the microstructures on the left and in the middle of FIG. 2). This frustration is also reflected by a reduction in the average column height from $2.4t_{[010]}$ in the pure system to $1.1t_{[010]}$ in the mixed system. The introduction of electrochemically inactive diluent particles (e.g., non-activated carbon) can decrease the gravimetric charge capacity of cathodes with the most extreme case being without LiFePO$_4$ particles present in the system (see the microstructure on the right in FIG. 2). The electronically conductive nature of the diluent particles can also lead to the enhancement of electron transfer with increasing diluent concentration. As shown in FIG. 2, the arrows at the bottom thereof show that an added mixture of diluent particles to the LiFePO$_4$ particles can increase both ion and electron transfer rates. In other words, an optimal amount of frustrating material can be added to achieve high rate performance and high charge capacity.

Figure 3:
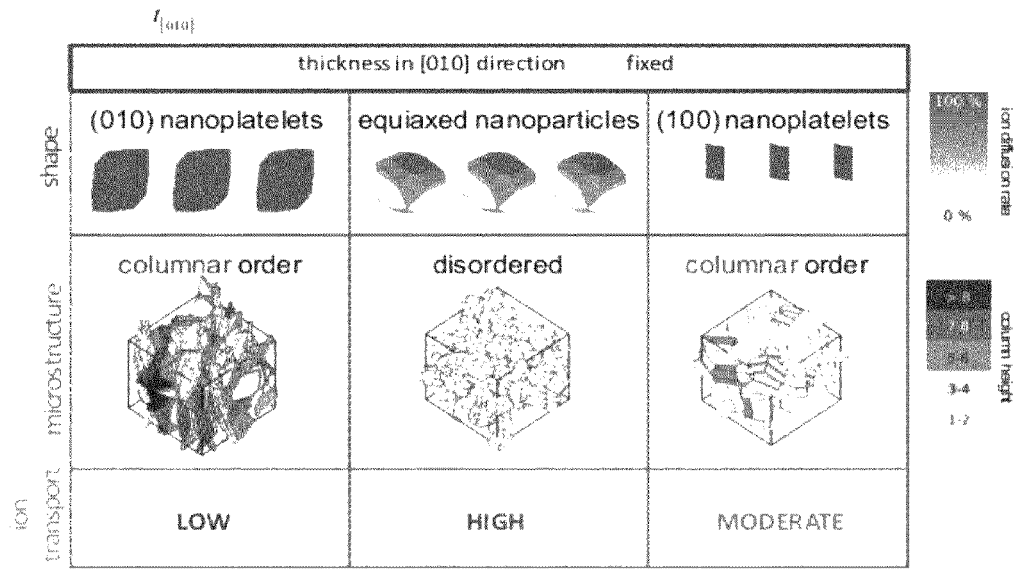
FIG. 3 is a schematic of another embodiment of shaped nanoparticles, microstructure formation, and relative lithium ion and electron transport rates.

With reference to FIG. 3, different particle shapes are considered along with their corresponding dense microstructure formation, and the relative lithium ion transport rates per unit mass of LiFePO$_4$. Each shape (i.e., top row) in FIG. 3 is most heavily shaded according to the alignment of its normal vectors with the [010] crystal direction. In this embodiment, all shapes are assumed to have approximately the same size. The equiaxed particles exhibited the optimal shape for lithium ion transport as a result of high surface area available for lithium ion diffusion, whereas the platelets exhibited different performance depending on the orientation of the largest facet on the particle.

In particular, simulations reveal that (010) and (100) nanoplatelets undergo columnar ordering, as shown in FIG. 3 (i.e., see the left dense microstructure). In the case of (010) nanoplatelets, columnar ordering can be problematic to the lithium ion transport performance because electrolyte is restricted access to portions of the (010) facets that are obscured or blocked in columns by adjacent nanoplatelets. Columnar ordering can decrease lithium ion transfer rates by approximately 80% relative to isolated nanoplatelets. In contrast, columnar ordering of (100) nanoplatelets can be beneficial to lithium ion transport because only diffusively-passive (100) facets are restricted access to electrolyte, while (010) facets are preferentially exposed to the electrolyte as a result of these self-assembled columns. Equiaxed nanoparticles can exhibit disorder with little obscuration of (010) facets. Additionally, equiaxed nanoparticles can possess larger diffusively active surface area normal to the [010] direction and consequently exhibit greater lithium ion transport rates relative to nanoplatelets (of either shape) if each shape has the same thickness in the [010] direction.

Though equiaxed particles can provide optimal performance among the different shapes studied when $t_{[010]}$ is fixed, experimental syntheses reveal that the minimum possible $t_{[010]}$ that can be synthesized depends on the particle shape. In particular, the smallest particles synthesized were (010) nanoplatelets (e.g., <20 nm), while larger equiaxed particles (e.g., 50 nm) were synthesized. Direct comparison of the experimental data to present theoretical results can be difficult because of the variety of synthesis conditions employed (e.g., low temperature precipitation, solid-state, and solvothermal syntheses). To better understand this, the rate performance of several experimentally realized particle shapes has been simulated at a charge capacity of 120 mA-hr/g, as displayed in Table 1 below. Equiaxed particles and (100) nanoplatelets provide better performance among pure systems, as a result of columnar order in pure (010) nanoplatelet systems, but the mixed system (i.e., see the microstructure shown in the middle of FIG. 3) among these more practical cases can exhibit substantial enhancement relative to others. Direct comparison of experimental data to the theoretical results is difficult because of the variety of synthesis conditions employed (e.g., low temperature precipitation, solid-state, and solvothermal syntheses). These results therefore only provide a means for comparing the transport performance of the present systems relative to one another.

TABLE 1

Dimensionless discharge rate at which 120 mA-hr/g galvanostatic discharge capacity is achieved, $n_{120\ mA\text{-}hr/g}$, where $n_{120\ mA\text{-}hr/g}$ = 1 corresponds to a discharge rate of 170 mA/g-LiFePO$_4$.

| | | $n_{120\ mA\text{-}hr/g}$ | |
|---|---|---|---|
| Shape | $t_{[010]}$ (nm) | Two Phase | Single Phase |
| Equiaxed particles | 50 | 5.8 | 35 |
| (100) Nanoplatelets | 40 | 6.6 | 32 |
| (010) Nanoplatelets [a' = 20.7] | 20 | 0.81 | 5.6 |
| (010) Nanoplatelets [a' = 10.4] | 20 | 1.8 | 13 |
| (010) Nanoplatelets [a' = 5.2] | 20 | 3.3 | 24 |
| 66 vol % (010) Nanoplatelets [a' = 5.2] + Diluent [d = 1.5$t_{[010]}$] | 20 | 22 | 79 |

These values were determined with two different diffusion models, assuming two phase and single phase diffusion processes, respectively.

Considering the feasibility of transport performance manipulation by tailoring the extent of column ordering in jammed systems of (010) nanoplatelets, other methods of columnar order frustration than manipulation of particle aspect ratio may be desirable. Other means can be particularly desirable to frustrate columnar ordering if it is experimentally infeasible to synthesize nanoplatelet shapes of moderate aspect ratio. As described above, binary mixtures of LiFePO$_4$ nanoplatelets and equiaxed nanoparticles were developed.

Figure 4:
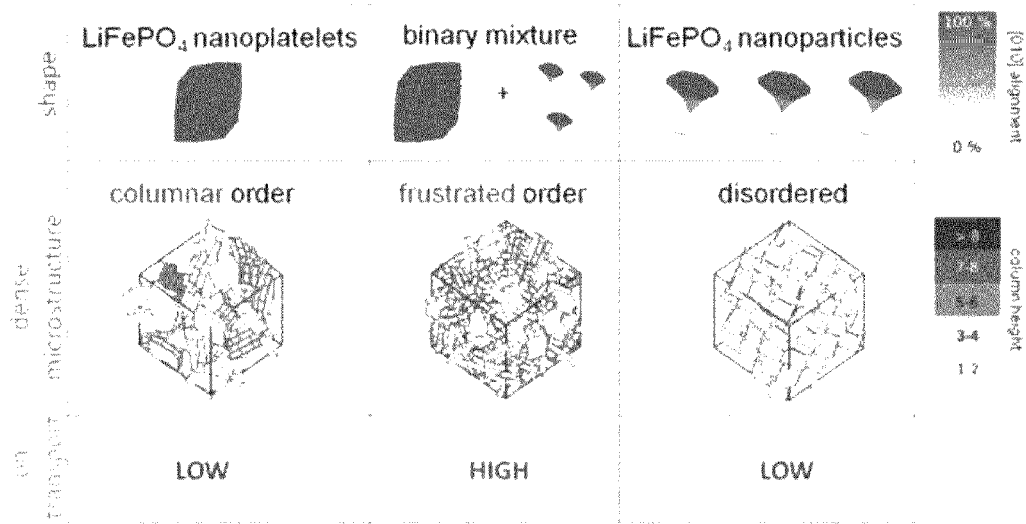
FIG. 4 is a schematic of a different embodiment of shaped nanoparticles, microstructure formation, and relative lithium ion transport rates.

As shown in FIG. 4, a binary mixture of LiFePO$_4$ nanoparticles and nanoplatelets with $t_{[010],particle}/t_{[010],platelet}=1.5$ was considered with a platelet aspect ratio of 5.2, which is experimentally feasible with mixtures of 50 nm equiaxed nanoparticles and 30 nm nanoplatelets. As previously described, nanoplatelets can form in columnar stacks (i.e., see the far left microstructure in FIG. 4) that inhibit lithium ion transport, while nanoparticles form disordered systems (i.e., see the far right microstructure in FIG. 4) that retain electrolyte access. For nanoplatelets having an aspect ratio of approximately 5.2, for example, such stacking reduces the lithium ion transport by about 54% relative to that of isolated nanoplatelets. Of interest, when 32 wt % nanoparticles were mixed with nanoplatelets (e.g., the disordered dense microstructure shown in FIG. 4), columnar order frustration occurred and enabled electrolyte access. Further, the ion transport rate of nanoplatelets in the binary mixture was only reduced by 25% relative to that of isolated nanoplatelets. The effect of binary mixtures and polydispersity to enhance exposure of (010) facets to electrolyte can be even more significant for higher aspect ratio nanoplatelets.

As described, adding diluent nanoparticles can also frustrate columnar ordering. Here, a secondary constituent is mixed with nanoplatelets in order to frustrate columnar ordering and yield electrolyte access to all (010) facets of the nanoplatelets. Through physics-based simulations it has been observed that the efficacy of equiaxed particles to frustrate columnar ordering increased as the equiaxed particle size was reduced relative to platelet thickness. Though LiFePO$_4$ nanoparticles may not feasibly be synthesized with such small sizes, other materials, such as carbon nanoparticles (i.e., diluent nanoparticles) can serve in a similar manner. Although carbon is a standard diluent nanoparticle, gold, silver, aluminum, or any other conductive nanoparticle may be used as the secondary constituent.

As shown in Table 2 below, diluent and binder nanoparticles can reduce the gravimetric energy density of LiFePO$_4$ cathodes by 10-40%. In the table, the weight percentage of carbon and binder constituents in the final composite are provided in parentheses.

TABLE 2

Carbon forms and binders incorporated in LiFePO$_4$ composite cathode preparation.

| Synthesis Carbon | Binding Carbon | Binder | LiFePO$_4$ wt % |
|---|---|---|---|
| Ketjen black (5-10) | — | PTFE (3) | 87-92 |
| — | Acetylene black (20) | PVDF (5) | 75 |
| Carbon black (20) | — | PVDF (5) | 75 |
| Xerogel (15) | Super S carbon black (5) | PVDF (5) | 75 |
| — | Ketjen black (15) | PTFE (5) | 80 |
| Glucose (6) | Alfa carbon black (18) | PVDF (18) | 58 |
| Graphite (4) | Acetylene black (10) | PVDF (5) | 81 |
| Carbon black (4) | Acetylene black (10) | PVDF (5) | 81 |
| Acetylene black (4) | Acetylene black (10) | PVDF (5) | 81 |
| D-gluconic acid | Super P carbon black (15) | Kynar 2801 (15) | 70 |

The simulation results for binary mixtures of LiFePO$_4$ nanoplatelets with diluent nanoparticles indicate substantial frustration of columnar ordering will occur for nanoparticles having a size similar to platelet thickness. Carbon black particles can exhibit nano-metric particle size (~100 nm), but generally the particles formed fused networks with the exception of 'thermal blacks'. The particles and the fused networks formed have dimensions much greater than the nanoplatelet thicknesses of interest for high-rate applications. Consequently, the size and shape of carbon nanoparticles in the mixture can be selectively chosen to achieve the frustration of columnar ordering. Networks formed by these carbon particles in dense, jammed systems can also improve the effective electrical conductivity of the composite cathode, reducing internal resistance of the battery. In addition, the simulation results verify that spheroidal equiaxed carbon particle shapes (e.g., regular icosahedra) are capable of frustrating the columnar ordering of nanoplatelets as are the cuboidal LiFePO$_4$ particles.

Carbonaceous species can be added during the synthesis process to reduce or avoid agglomeration. This approach, however, may not be possible to incorporate carbon between the synthesized nanoplatelets. For example, below a certain threshold size of the nanoplatelet during synthesis, hierarchial structures are unable to be fabricated during synthesis. In contrast, the present disclosure has found that by adding diluent nanoparticles to the electrochemically active particles, e.g., LiFePO$_4$, it is possible to reduce columnar ordering and achieve the benefits necessary to produce a commercially-viable lithium ion cathode.

Figure 5:
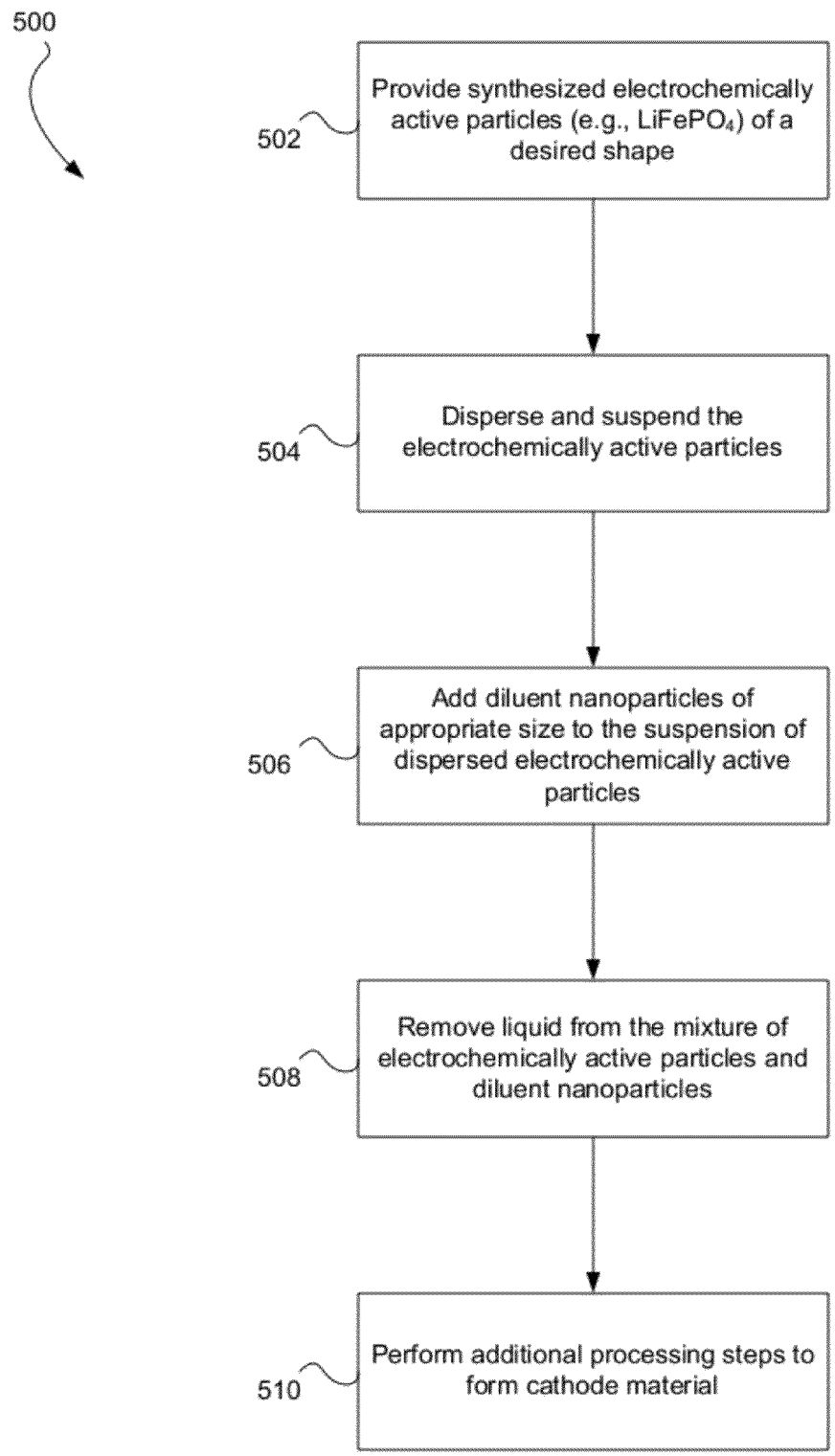
FIG. 5 is a flow diagram of a method of forming a lithium ion cathode.

To do so, an exemplary method of fabrication is shown in FIG. 5. In this method, synthesized electrochemically active particles are provided in a first step 502. The manner in which the electrochemically active particles are synthesized is not substantially relevant. Any synthesis process can be used for forming any desired shape of electrochemically active particles including hydrothermal, solvothermal, or any transparent synthesis process which synthesizes a certain shaped particle (e.g., LiFePO$_4$).

Regardless of the synthesis process used to yield the shaped electrochemically active particles, diluent nanoparticles of an appropriate size can be mixed therewith. However, before adding the diluent nanoparticles, a second step 504 is to disperse the electrochemically active particles in a liquid solution and suspend the particles. A surfactant can be added to the dispersion step to separate the electrochemically active particles and obtain a liquid suspension. Following the suspension of the particles, the diluent nanoparticles can be added in another step 506 to the solution to frustrate columnar ordering and achieve a full rate potential of the cathode material regardless of the synthesis process. In an alternative embodiment, step 406 can be performed before step 404 such that the diluent nanoparticles are mixed with the electrochemically active particles and then the mixture is dispersed according to step 404.

Once the diluent nanoparticles are added to the suspension, liquid from the suspension can be removed by an evaporation process (e.g., step 508). Other drying processes can include freeze drying or applying a vacuum to the suspension. Additional processing steps 510 can be performed to form the cathode material from the dried material. For instance, a binding material and/or other conductive additive can be incorporated into the material to form the composite cathode material.

In a further embodiment, a liquid suspension or slurry of constituent materials or additives (e.g., carbon black nanoparticles) and electrochemically active particles (e.g., LiFePO$_4$) can be provided. The slurry can be dried via a vacuum process and the remaining composite material is cured via a thermal processing step. Once cured, the material can undergo a calendering process by passing the cathode material under rollers at a high temperature and pressure. The calendering process can further densify the material for use as a cathode.

Another step in the method is to select diluent nanoparticles of an appropriate shape. This has been described above. The relationship between the size of the diluent nanoparticles and the electrochemically active particles can be important for frustrating the column structure. As such, it can be advantageous to select diluent nanoparticles having a diameter equal to or less than the thickness of the electrochemically active particles. Smaller particles have been found to better frustrate columnar ordering.

In addition, the amount, or weight or volume percentage, of diluent nanoparticles can be important too. It can be advantageous to form a cathode composite material having a higher fraction or ratio of electrochemically active material compared to diluent nanoparticles.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method of forming a high-capacity, high-rate lithium ion battery cathode material, comprising:
   A) providing a plurality of synthesized electrochemically active plate-shaped nanoparticles;
   B) adding a plurality of appropriately sized diluent particles to the electrochemically active plate-shaped nanoparticles to form a mixed suspension;
   C) removing any liquid from the suspension to form a composite material, thereby introducing steric defects between the electrochemically active plate-shaped nanoparticles; and
   D) processing the composite material to form a high-capacity, high-rate lithium ion battery cathode material, wherein the processing step comprises: curing the composite material, and densifying the composite material, and the densifying step comprises further introducing steric defects between the electrochemically active plate-shaped nanoparticles by passing the composite material through a roll press, said composite material having column heights limited to twice the thickness of the electrochemically active plate-shaped nanoparticles in the [010] direction.

2. The method of claim 1, wherein the electrochemically active plate-shaped nanoparticles comprises lithium iron phosphate.

3. The method of claim 1, wherein the diluent particles comprise any conductive nanoparticle material.

4. The method of claim 1, wherein each of the diluent particles comprises a diameter equal to or less than the thickness of the electrochemically active plate-shaped nanoparticles.

5. The method of claim 1, wherein A) further comprises separating the electrochemically active plate-shaped nanoparticles from one another.

6. The method of claim 5, wherein A) further comprises: adding a surfactant to separate the electrochemically active plate-shaped nanoparticles; and forming a suspension of the electrochemically active plate-shaped nanoparticles.

7. The method of claim 1, wherein the processing step D) comprises adding a binding material and a conductive additive to the composite material.

8. The method of claim 1, wherein the removing step C) comprises evaporation, freeze drying or vacuum filtration.

* * * * *